Patented Oct. 18, 1932

1,882,758

UNITED STATES PATENT OFFICE

EDGAR C. BRITTON AND RAY D. HOLMES, OF MIDLAND, MICHIGAN, ASSIGNORS TO THE DOW CHEMICAL COMPANY, OF MIDLAND, MICHIGAN, A CORPORATION OF MICHIGAN

PREPARATION OF AMINO-PHENOLS AND PRIMARY ARYL AMINES CONJOINTLY

No Drawing. Application filed March 19, 1929. Serial No. 348,356.

The present invention relates to the preparation of amino-phenols by the reduction of the corresponding hydroxy-azo compounds, and in particular to methods wherein such reduction is effected through the agency of hydrogen sulphide or an alkaline sulphide in the presence of water.

It is known that oxy-azobenzol may be reduced to para-amino-phenol and aniline in a strongly alkaline medium by heating a mixture of such oxy-azobenzol, sodium sulphide and sodium hydroxide to 180° C., with the addition of a limited amount of water just sufficient to supply the hydrogen required for the reduction. (D. R. P. 95,755). Jacobson and Hönigsberger (Ber. 36; 4110) carried out this reduction at a lower temperature by the use of ammonium sulphydrate or sulphide in an alcoholic medium, obtaining thereby a yield of 55 to 60 per cent para-amino-phenol. More recently it has been proposed (Brit. Pat. 179,753) to conduct the reaction in an aqueous medium consisting of a solution of sodium carbonate in which the oxy-azobenzol is dissolved or suspended by passing hydrogen sulphide or a gas containing hydrogen sulphide through the mixture at a temperature of about 100° C.

We have found that none of the aforementioned methods lead to a commercially satisfactory conversion of raw materials into the desired products. The yield of amino-phenol particularly, as obtained by such methods, falls far short of the theoretical for the materials actually reacted, and almost invariably the product is badly discolored and contaminated with impurities difficult of removal. For instance, when it is attempted to effect the reduction by passing hydrogen sulphide gas into the hot aqueous mixture, the absorption of gas is found to be quite incomplete, considerable volumes thereof escaping from the reaction vessel, thus necessitating the provision of suitable means for their recovery which adds appreciably to the cost of the product. We have now found that losses of hydrogen sulphide may be substantially avoided and a higher yield of a purer product may be realized if the reaction is carried out with active hydrogen sulphide formed in statu nascendi within the reaction mixture. In other words, by such procedure a far more complete absorption of the gas is attained and side reactions leading to the formation of decomposition products are largely prevented.

To the accomplishment of the foregoing and related ends, the invention, then, consists of the steps hereinafter fully described and particularly pointed out in the claims, the following description setting forth certain procedure illustrating a few of the ways in which the principle of the invention may be used.

The generation of hydrogen sulphide within the reaction mixture may be conveniently accomplished by the action of an acid upon a sulphide, preferably a water soluble sulphide, e. g., a sulphide of an alkali or alkaline earth metal. An advantage incident to the use of an alkali or alkaline earth metal sulphide is that the aqueous solution thereof has a pronounced alkaline reaction, sufficiently so that the hydroxy-azo compound may be completely dissolved therein at ordinary temperatures. On the other hand sodium carbonate, for instance, has only a limited dissolving power for hydroxy-azo benzene or allied compound, particularly at ordinary temperatures, so that such compound remains largely in suspension rather than in solution when the reaction is carried out in an aqueous sodium carbonate solution. By choosing an aqueous medium wherein the reactants are completely dissolved, and generating hydrogen sulphide in situ within the solution, we are enabled to secure substantially complete reaction and to avoid any material losses of hydrogen sulphide.

While a strong mineral acid, such as hydrochloric acid, may be used to react upon the alkaline sulphide for generating hydrogen sulphide, the rate of reaction therewith and, consequently, of evolution of gas may be excessively great unless such acid is added quite slowly as a dilute solution thereof. It is often preferable to employ a weaker acid, such as carbon dioxide, or an acidic salt, such as ammonium chloride, whereby a more effective control of the reaction may be exercised. If a sulphydrate, instead of a sulphide, be employed, such sulphydrate is itself of a sufficiently acidic character to bring about the reaction without the addition of another acid. Still another method of generating hydrogen sulphide consists in reacting between an aqueous caustic alkali solution and sulphur, this reaction taking place above 100° C. and preferably under pressure. In fact, the reduction may be brought about simply by heating an aqueous mixture containing the hydroxy-azo compound and an alkali metal sulphide dissolved therein, the prolonged action of water upon the sulphide in the presence of the reducible hydroxy-azo compound sufficing to effect the reaction. The time required, however, is much greater than when an acid is employed, and in general the latter procedure is preferred.

The various equations to show the relative quantities of materials involved in the reactions just referred to may be expressed as the following, wherein R and R′ represent aryl radicals which may be further substituted in the nucleus. Each molecule of hydroxy-azo compound is reduced to a molecule of primary amine and a molecule of amino-phenol. Equation (1) represents the reaction when water alone is employed to react with the inorganic sulphide, the latter being converted to thio-sulphate;

(1) $2R.N:N.R'.OH + 2Na_2S + 3H_2O \rightarrow$
$2RNH_2 + 2NH_2.R'ONa + Na_2S_2O_3$.

With a monovalent acid, e. g., HCl, the reaction proceeds as in Equation (2);

(2) $R.N:N.R'OH + 2Na_2S + 2HCl + H_2O \rightarrow$
$RNH_2 + NH_2.R'.ONa + 2NaCl + 2S + NaOH$ When $CO_2$ is employed, the reaction takes place similarly, as in Equation (3);

(3) $R.N:N.R'OH + 2Na_2S + CO_2 + 2H_2O \rightarrow$
$RNH_2 + NH_2R'ONa + Na_2CO_3 + 2S + NaOH$ An acidic salt, e. g., $NH_4Cl$, reacts in a manner analogous to that of a free acid, as in Equation (4);

(4) $R.N:N.R'OH + 2Na_2S + 3NH_4Cl + 3H_2O \rightarrow RNH_2 + NH_2R'ONa + 3NH_4OH + 3NaCl + 2S$.

Then, in the case where hydrogen sulphide is formed by heating sulphur and aqueous caustic alkali solution, the reaction is expressed by Equation (5);

(5) $3R.N:N.R'OH + 2S + 7NaOH + H_2O \rightarrow 3RNH_2 + 3NH_2R'ONa - 2Na_2SO_4$.

For each mole of the hydroxy-azo compound 4 equivalents of hydrogen are required to effect the reduction. Theoretically, at least, such hydrogen is supplied in the presence of a reducible substance by hydrogen sulphide, $H_2S$, generated within the mixture during reaction and acting as the reducing agent. This is most readily accomplished by the reaction of the acid employed with the metallic sulphide, viz;

(6) $Na_2S + 2HCl \rightarrow 2NaCl + H_2S$

However, other reactions also come into play for releasing $H_2S$. For example, the hydroxy-azo compound is itself an acidic compound, which reacts with a basic sulphide, e. g., $Na_2S$, to form the corresponding sulphydrate or hydrogen, sulphide, viz;

(7) $R.N:N.R'OH + Na_2S \rightarrow$
$RN:N.R'ONa + NaSH$ (8) $2R.N:N.R'OH + Na_2S \rightarrow$
$2RN:N.R'ONa + H_2S$ Finally the alkaline sulphide or sulphydrate, in the presence of an oxidizing, i. e., a reducible, substance, may be hydrolyzed by water, as in Equations (9) and (10);

(9) $NaSH + H_2O \rightarrow NaOH + H_2S$

(10) $Na_2S + 2H_2O \rightarrow 2NaOH + H_2S$

As will be seen from Equations (2), (3) and (4), less acid or acid salt is employed than would be required to react with all of the alkali sulphide to liberate $H_2S$ therefrom. This is done intentionally so that the reaction mixture will remain alkaline, and thereby hold in solution the sulphur formed in the reaction, probably as a polysulphide. Otherwise, if the solution becomes neutral or acid, sulphur is precipitated, in such case involving a troublesome separation thereof before the principal reaction products are recoverable in pure form from the mixture. The conversion of the remainder of the alkaline sulphide in the mixture to active hydrogen sulphide is accomplished in accordance with one or more of Equations (7) to (10), inclusive. Accordingly, the principal reaction, as expressed by Equations (2), (3) or (4), is conducted throughout in an alkaline medium, the acid compound being added gradually and with vigorous agitation so that no excess of acid shall be introduced, even locally, at any time. When proceeding in accordance with Equation (5), of course, such precautions are unnecessary. In either case, however, under proper control the hydrogen sulphide is absorbed as rapidly as it is formed, the utilization thereof being substantially quantitative.

The resulting reaction product consists of an aqueous alkaline solution containing the amino-phenol and sulphur dissolved therein, while the primary amine product forms a separate oily layer. The latter is conveniently removed by distilling with steam, either at atmospheric or under reduced pressure, or may be extracted by means of a solvent, such as benzene or the like. Extraction may at times be advisable, in case the amino-phenol product is too susceptible to oxidation when the mixture is distilled with steam. The aqueous solution is then filtered, if necessary, to separate a small amount of tarry or carbonaceous material that may be present, and then acidified to precipitate the free aminophenol. For the latter operation it is preferable to saturate the solution with a relatively weak acid, such as $CO_2$, or to employ an acidic salt, such as $NH_4Cl$, thereby avoiding precipitation of sulphur which occurs when a strong mineral acid is used, particularly if an access over the exact amount of acid required for neutralization should be fortuitously added. The crystals of aminophenol are filtered and washed with hydrogen sulphide water, being obtained without recrystallization in a highly pure form and remarkably free from discoloration. An alternative procedure is to acidify the solution, after separation of the primary amine, with an excess of strong mineral acid, thereby precipitating sulphur and converting the amino-phenol to the salt of the acid employed, such salt remaining in solution. The mixture is then filtered to remove sulphur and the filtrate evaporated to crystallize out the amino-phenol salt.

In the following illustrative examples, various specific applications of our improved method are described in detail, but it will be understood that the invention is not limited thereto.

*Example 1.*—One mole hydroxy-azo-benzene was added to an approximately 15 per cent. aqueous solution containing 2 moles sodium sulphide. The mixture was heated to about 100° C. and then 1 mole carbon dioxide was passed in, such introduction requiring about 1 hour. The reaction mixture was steam distilled to remove aniline and the hot residual solution filtered. The filtrate was treated with $NH_4Cl$ to precipitate para-amino-phenol, and the crystals filtered off and washed with $H_2S$ water. Yield of aniline, 96 per cent., and of para-amino-phenol, 88.6 per cent.

*Example 2.*—One mole of ortho-toluene-azo-phenol was dissolved in a 25 per cent. aqueous solution containing 2 moles sodium sulphide. The solution was heated to about 100° C., and 2 moles hydrochloric acid in 10 per cent. solution were added gradually during 1½ hours. The mixture was then steam distilled to remove ortho-toluidine and the residual solution filtered to clarify it. The filtrate was treated with ammonium chloride to precipitate the para-amino-phenol; the crystals of the latter were filtered off and washed with hydrogen sulphide water. Yield of ortho-toluidine, 100 per cent., and of para-amino-phenol, 65 per cent.

*Example 3.*—One mole benzene-azo-3-phenyl-4-phenol was dissolved in a 20 per cent. aqueous solution containing 2 moles sodium sulphide. The mixture was heated to boiling and 2 moles hydrochloric acid in dilute aqueous solution were added during 2 hours. Heating was continued about 3 hours longer, then the aniline was distilled off with steam. The product, ortho-phenyl-para-amino-phenol, was precipitated with ammonium chloride and the crystals of the latter filtered off and washed. Yield of aniline 95 per cent., and of ortho-penyl-para-amino-phenol (M. P. 200° C.), 92.5 per cent.

*Example 4.*—One mole benzene-azo-α-naphthol and 2 moles sodium sulphide were dissolved to make an aqueous solution containing about 30 per cent. solids. The solution was heated to from 70° to 75° C. and maintained at such temperature while 1 mole carbon dioxide was passed in during approximately 1 hour. The hot solution was then filtered and extracted with benzene to separate the aniline therefrom. The aqueous layer was acidified with dilute sulphuric acid in excess and concentrated under reduced pressure. The hydrosulphate salt of 4-amino-1-naphthol crystallized from the solution on cooling and the crystals were filtered off. Yield of 4-amino-1-naphthol, 77 per cent.

*Example 5.*—One mole hydroxy-azo-benzene was added to an approximately 24 per cent. solution of barium sulphydrate containing 1¾ moles of the latter. The mixture was heated to about 60° C. and the hydroxy-azo-benzene was completely dissolved thereby. The solution was then boiled for about 5 minutes without the addition of acid, to complete the reduction. Aniline was removed by steam distillation, and the residual solution was filtered and cooled to about 15° C. The para-amino-phenol was precipitated by adding a slight excess of ammonium chloride. A light colored product of very good quality was obtained. Yield of aniline, 94.5 per cent., and of para-amino-phenol, 62 per cent.

*Example 6.*—One mole hydroxy-azo-benzene was dissolved in 7 moles caustic soda in 15 per cent. aqueous solution, and an excess, about 8 moles, sulphur was added. The mixture was placed in an iron autoclave provided with a stirrer and heated for 5 hours at 125° C. Aniline was removed from the reaction product by distilling with steam, and the residual solution was saturated with carbon dioxide to precipitate para-amino-phenol. Yield of aniline 96.5 per cent. and of para-amino-phenol 68 per cent.

By similar procedure hydroxy-azo compounds generally, as well as substituted derivatives thereof containing non-reducible substituent groups, may be treated for the preparation conjointly of the corresponding amino-phenols and primary arylamines.

In the following claims the term "acidic compound" is used to include an acid or acid salt as hereinbefore set forth.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. The method for the preparation of an amino-phenol and a primary arylamine conjointly which comprises reducing the corresponding hydroxy-azo compound in an aqueous solution by means of active hydrogen sulphide generated in situ during such reaction.

2. The method for the preparation of an amino-phenol and a primary arylamine conjointly which comprises reducing the corresponding hydroxy-azo compound in an aqueous alkaline sulphide solution by means of active hydrogen sulphide generated in situ during such reaction.

3. The method for the preparation of an amino-phenol and a primary arylamine conjointly which comprises reacting upon the corresponding hydroxy-azo compound in an aqueous alkaline sulphide solution with an acidic compound.

4. The method for the preparation of an amino-phenol and a primary arylamine conjointly which comprises reacting upon the corresponding hydroxy-azo compound in an aqueous alkaline sulphide solution with an acidic compound in amount insufficient to neutralize completely such solution.

5. The method for the preparation of an amino-phenol and a primary arylamine conjointly which comprises reacting upon the corresponding hydroxy-azo compound in an aqueous alkaline sulphide solution with an acidic compound in amount insufficient to neutralize completely such solution, removing such primary arylamine, acidifying the residual aqueous solution and separating the amino-phenol precipitated thereby.

6. The method for the preparation of an amino-phenol and a primary arylamine conjointly which comprises reacting upon the corresponding hydroxy-azo compound in an aqueous alkaline sulphide solution with an acidic compound in amount insufficient to neutralize completely such solution, removing such primary arylamine by distilling with steam, acidifying the residual aqueous solution and separating the amino-phenol precipitated thereby.

7. The method for the preparation of para-amino-phenol and aniline conjointly which comprises reducing hydroxy-azo-benzene in an aqueous medium by means of active hydrogen sulphide generated in situ during such reaction.

8. The method for the preparation of para-amino-phenol and aniline conjointly which comprises reducing hydroxy-azo-benzene in an aqueous alkaline sulphide solution by means of active hydrogen sulphide generated in situ during such reaction.

9. The method for the preparation of para-amino-phenol and aniline conjointly which comprises reacting upon hydroxy-azo-benzene in an aqueous alkaline sulphide solution with an acidic compound.

10. The method for the preparation of para-amino-phenol and aniline conjointly which comprises reacting upon hydroxy-azo-benzene in an aqueous alkaline sulphide solution with an acidic compound in amount insufficient to neutralize completely such solution.

11. The method for the preparation of para-amino-phenol and aniline conjointly which comprises reacting upon hydroxy-azo-benzene in an aqueous alkaline sulphide solution with an acidic compound in amount insufficient to neutralize completely such solution, removing aniline by distilling with steam, acidifying the residual aqueous solution and separating the amino-phenol precipitated thereby.

12. The method as set forth in claim 11, sodium sulphide being used for the alkaline sulphide therein.

13. The method as set forth in claim 11, carbon dioxide being used for the acidic compound therein.

14. The method for the preparation of an amino-phenol and a primary arylamine conjointly which comprises dissolving the corresponding hydroxy-azo compound in an aqueous alkaline sulphide solution, heating to a temperature between about 60° and the atmospheric boiling point of the mixture while gradually adding an acidic compound in amount equivalent to about one-half that theoretically required to react with the sulphide present to convert the same completely to hydrogen sulphide, then separating the relatively insoluble primary arylamine from the aqueous solution, acidifying the residual solution and separating the amino-phenol precipitated thereby.

15. The method for the preparation of para-amino-phenol and aniline conjointly which comprises dissolving hydroxy-azo-benzene in an approximately 15 per cent aqueous sodium sulphide solution in proportion of one mole of such hydroxy-azo compound to two moles of such sulphide, heating to approximately 100° C. while gradually adding about one mole of carbon dioxide, distilling with steam to remove aniline, acidifying the residual solution to a weak acid reaction and filtering para-amino-phenol precipitated thereby from the aqueous solution.

Signed by us this 15 day of March, 1929.

EDGAR C. BRITTON.
RAY D. HOLMES.